(12) United States Patent
Zuolo et al.

(10) Patent No.: US 11,934,696 B2
(45) Date of Patent: Mar. 19, 2024

(54) MACHINE LEARNING ASSISTED QUALITY OF SERVICE (QOS) FOR SOLID STATE DRIVES

(71) Applicant: Microchip Technology Inc., Chandler, AZ (US)

(72) Inventors: Lorenzo Zuolo, Lusia (IT); Rino Micheloni, Turate (IT)

(73) Assignee: Microchip Technology Inc., Chandler, AZ (US)

(*) Notice: Subject to any disclaimer, the term of this patent is extended or adjusted under 35 U.S.C. 154(b) by 291 days.

(21) Appl. No.: 17/398,091

(22) Filed: Aug. 10, 2021

(65) Prior Publication Data
US 2022/0374169 A1    Nov. 24, 2022

Related U.S. Application Data

(60) Provisional application No. 63/190,222, filed on May 18, 2021.

(51) Int. Cl.
*G06F 3/06* (2006.01)
*G06N 3/08* (2023.01)
(52) U.S. Cl.
CPC .......... *G06F 3/0659* (2013.01); *G06F 3/0611* (2013.01); *G06F 3/0679* (2013.01); *G06N 3/08* (2013.01)
(58) Field of Classification Search
CPC .... G06F 3/0659; G06F 3/0611; G06F 3/0679; G06N 3/08
See application file for complete search history.

(56) References Cited

U.S. PATENT DOCUMENTS 6,119,260 A    9/2000  Tomisawa et al.
6,567,313 B2   5/2003  Tanaka et al.
(Continued)

FOREIGN PATENT DOCUMENTS

WO    2020117348 A3    12/2020

OTHER PUBLICATIONS

Anonymous, "Training checkpoints | TensorFlow Core", webpage, Dec. 28, 2019, XP055886114, p. 1-p. 8, URL:https://web.archive.org/web/20191228020311/https://www.tensorflow.org/guide/checkpoint.
(Continued)

*Primary Examiner* — Charles Rones
*Assistant Examiner* — Han V Doan
(74) *Attorney, Agent, or Firm* — Glass & Associates; Kenneth Glass

(57) ABSTRACT

A method for meeting quality of service (QoS) requirements in a flash controller that includes one or more instruction queues and a neural network engine. A configuration file for a QoS neural network is loaded into the neural network engine. A current command is received at the instruction queue(s). Feature values corresponding to commands in the instruction queue(s) are identified and are loaded into the neural network engine. A neural network operation of the QoS neural network is performed using as input the identified feature values to predict latency of the current command. The predicted latency is compared to a first latency threshold. When the predicted latency exceeds the first latency threshold one or more of the commands in the instruction queue(s) are modified. The commands are not modified when the predicted latency does not exceed the latency threshold. A next command in the instruction queue(s) is then performed.

17 Claims, 8 Drawing Sheets

(56) References Cited

U.S. PATENT DOCUMENTS

| | | | |
|---|---|---|---|
| 6,704,871 B1 | 3/2004 | Kaplan et al. | |
| 7,529,215 B2 | 5/2009 | Osterling et al. | |
| 7,650,480 B2 | 1/2010 | Jiang | |
| 7,930,623 B2 | 4/2011 | Pisek et al. | |
| 8,429,325 B1 | 4/2013 | Onufryk et al. | |
| 8,621,318 B1 | 12/2013 | Micheloni et al. | |
| 8,656,257 B1 | 2/2014 | Micheloni et al. | |
| 8,665,648 B2 | 3/2014 | Mun et al. | |
| 8,689,074 B1 | 4/2014 | Tai | |
| 8,694,849 B1 | 4/2014 | Micheloni et al. | |
| 8,694,855 B1 | 4/2014 | Micheloni et al. | |
| 8,707,122 B1 | 4/2014 | Micheloni et al. | |
| 8,769,380 B1 | 7/2014 | Burd et al. | |
| 8,966,335 B2 | 2/2015 | Lunelli et al. | |
| 8,971,112 B2 | 3/2015 | Crippa et al. | |
| 8,984,376 B1 | 3/2015 | Norrie | |
| 8,990,661 B1 | 3/2015 | Micheloni et al. | |
| 9,021,333 B1 | 4/2015 | Northcott | |
| 9,092,353 B1 | 7/2015 | Micheloni et al. | |
| 9,128,858 B1 | 9/2015 | Micheloni et al. | |
| 9,235,467 B2 | 1/2016 | Micheloni et al. | |
| 9,251,909 B1 | 2/2016 | Camp et al. | |
| 9,268,531 B1 | 2/2016 | Woo et al. | |
| 9,292,428 B2 | 3/2016 | Kanamori et al. | |
| 9,305,661 B2 | 4/2016 | Micheloni et al. | |
| 9,397,701 B1 | 7/2016 | Micheloni et al. | |
| 9,417,804 B2 | 8/2016 | Micheloni et al. | |
| 9,444,655 B2 | 9/2016 | Sverdlov et al. | |
| 9,448,881 B1 | 9/2016 | Micheloni et al. | |
| 9,450,610 B1 | 9/2016 | Micheloni et al. | |
| 9,454,414 B2 | 9/2016 | Micheloni et al. | |
| 9,564,922 B1 | 2/2017 | Graumann et al. | |
| 9,590,656 B2 | 3/2017 | Micheloni et al. | |
| 9,747,200 B1 | 8/2017 | Micheloni | |
| 9,799,405 B1 | 10/2017 | Micheloni et al. | |
| 9,813,080 B1 | 11/2017 | Micheloni et al. | |
| 9,886,214 B2 | 2/2018 | Micheloni et al. | |
| 9,892,794 B2 | 2/2018 | Micheloni et al. | |
| 9,899,092 B2 | 2/2018 | Micheloni | |
| 10,152,273 B2 | 12/2018 | Micheloni et al. | |
| 10,157,677 B2 | 12/2018 | Marelli et al. | |
| 10,216,422 B2 | 2/2019 | Kim et al. | |
| 10,230,396 B1 | 3/2019 | Micheloni et al. | |
| 10,283,215 B2 | 5/2019 | Marelli et al. | |
| 10,291,263 B2 | 5/2019 | Marelli et al. | |
| 10,332,613 B1 | 6/2019 | Micheloni et al. | |
| 10,490,288 B1 | 11/2019 | Wang et al. | |
| 10,715,307 B1 | 7/2020 | Jin | |
| 10,861,562 B1 | 12/2020 | Xiong et al. | |
| 11,398,291 B2 | 7/2022 | Zuolo et al. | |
| 11,514,994 B1 | 11/2022 | Zuolo et al. | |
| 2002/0144210 A1 | 10/2002 | Borkenhagen et al. | |
| 2006/0106743 A1 | 5/2006 | Horvitz | |
| 2006/0161830 A1 | 7/2006 | Yedidia et al. | |
| 2006/0282603 A1 | 12/2006 | Onufryk et al. | |
| 2007/0076873 A1 | 4/2007 | Yamamoto et al. | |
| 2007/0157064 A1 | 7/2007 | Falik et al. | |
| 2011/0231731 A1 | 9/2011 | Gross et al. | |
| 2011/0255453 A1 | 10/2011 | Roh et al. | |
| 2012/0166714 A1 | 6/2012 | Mun et al. | |
| 2012/0287719 A1 | 11/2012 | Mun et al. | |
| 2013/0343495 A1 | 12/2013 | Han et al. | |
| 2014/0040697 A1 | 2/2014 | Loewenstein | |
| 2014/0146605 A1* | 5/2014 | Yang | G11C 11/5642 365/185.03 |
| 2014/0237313 A1 | 8/2014 | Wang et al. | |
| 2014/0281800 A1 | 9/2014 | Micheloni et al. | |
| 2014/0281823 A1 | 9/2014 | Micheloni et al. | |
| 2014/0310534 A1 | 10/2014 | Gurgi et al. | |
| 2015/0033037 A1 | 1/2015 | Lidman | |
| 2015/0049548 A1 | 2/2015 | Park et al. | |
| 2015/0100860 A1 | 4/2015 | Lee et al. | |
| 2016/0072527 A1 | 3/2016 | Suzuki et al. | |
| 2016/0124679 A1 | 5/2016 | Huang et al. | |
| 2016/0247581 A1 | 8/2016 | Suzuki et al. | |
| 2016/0266791 A1 | 9/2016 | Lin et al. | |
| 2016/0371014 A1* | 12/2016 | Roberts | G06F 3/0688 |
| 2017/0133107 A1 | 5/2017 | Ryan et al. | |
| 2017/0149446 A1 | 5/2017 | Tao et al. | |
| 2017/0213597 A1 | 7/2017 | Micheloni | |
| 2017/0263311 A1 | 9/2017 | Cometti | |
| 2018/0005670 A1 | 1/2018 | Lee et al. | |
| 2018/0033490 A1 | 2/2018 | Marelli et al. | |
| 2018/0046541 A1 | 2/2018 | Niu et al. | |
| 2018/0314586 A1 | 11/2018 | Artieri et al. | |
| 2019/0004734 A1 | 1/2019 | Kirshenbaum et al. | |
| 2019/0073139 A1* | 3/2019 | Kim | G06F 3/0613 |
| 2019/0087119 A1 | 3/2019 | Oh et al. | |
| 2019/0095794 A1 | 3/2019 | López et al. | |
| 2019/0317901 A1 | 10/2019 | Kachare et al. | |
| 2020/0004455 A1 | 1/2020 | Williams et al. | |
| 2020/0066361 A1 | 2/2020 | Ioannou et al. | |
| 2020/0074269 A1 | 3/2020 | Trygg et al. | |
| 2020/0125955 A1 | 4/2020 | Klinger et al. | |
| 2020/0151539 A1 | 5/2020 | Oh et al. | |
| 2020/0183826 A1 | 6/2020 | Beaudoin et al. | |
| 2020/0184245 A1* | 6/2020 | Huang | G06N 3/04 |
| 2020/0185027 A1 | 6/2020 | Rom et al. | |
| 2020/0210831 A1 | 7/2020 | Zhang et al. | |
| 2021/0109673 A1* | 4/2021 | Kim | G06F 3/0653 |
| 2021/0192333 A1 | 6/2021 | Thiruvengadam et al. | |
| 2021/0385012 A1 | 12/2021 | Buethe et al. | |
| 2022/0027083 A1 | 1/2022 | Zuolo et al. | |
| 2022/0050632 A1* | 2/2022 | Hong | G06F 13/102 |
| 2022/0051730 A1 | 2/2022 | Choi et al. | |
| 2022/0058488 A1 | 2/2022 | Zuolo et al. | |
| 2022/0116056 A1 | 4/2022 | Kaynak et al. | |
| 2022/0165348 A1 | 5/2022 | Zuolo et al. | |
| 2022/0188604 A1 | 6/2022 | Zuolo et al. | |
| 2022/0270698 A1 | 8/2022 | Zuolo et al. | |
| 2022/0329262 A1 | 10/2022 | Liu et al. | |
| 2022/0342582 A1 | 10/2022 | Graumann | |
| 2022/0365845 A1 | 11/2022 | Buch et al. | |
| 2022/0374169 A1 | 11/2022 | Zuolo et al. | |
| 2022/0375532 A1 | 11/2022 | Zuolo et al. | |
| 2022/0382629 A1 | 12/2022 | Graumann | |
| 2022/0383970 A1 | 12/2022 | Zuolo et al. | |
| 2022/0416812 A1 | 12/2022 | Wu | |
| 2023/0087247 A1 | 3/2023 | Li et al. | |

OTHER PUBLICATIONS

PCT/US2021/053250, International Search Report and Written Opinion, European Patent Office, dated Oct. 2, 2021.

U.S. Appl. No. 17/089,891, filed Nov. 5, 2020, Lorenzo Zuolo.

U.S. Appl. No. 17/148,200, filed Jan. 13, 2021, Lorenzo Zuolo.

U.S. Appl. No. 17/213,675, filed Mar. 26, 2021, Lorenzo Zuolo.

U.S. Appl. No. 17/234,993, filed Apr. 20, 2021, Lorenzo Zuolo.

U.S. Appl. No. 17/347,388, filed Jun. 14, 2021, Lorenzo Zuolo.

U.S. Appl. No. 17/385,857, filed Jul. 26, 2021, Lorenzo Zuolo.

U.S. Appl. No. 17/398,091, filed Aug. 10, 2021, Lorenzo Zuolo.

U.S. Appl. No. 17/506,735, filed Oct. 21, 2021, Lorenzo Zuolo.

U.S. Appl. No. 63/057,278, filed Jul. 27, 2020, Lorenzo Zuolo.

Noam Shazeer et al: Outrageously Large Neural Networks: The Sparsely-Gated Mixture-of-Experts Layer11 , arxiv .org, Cornell University Li bra ry, 201 Olin Li bra ry Cornell University Ithaca, NY 14853, Jan. 23, 2017.

Yu Cai et al, "Errors in Flash-Memory-Based Solid-State Drives: Analysis, Mitigation, and Recovery" 11 , arxiv. org, Cornell University Library, 201 Olin Library Cornell University Ithaca, NY 14853, Nov. 28, 2017.

J. Mu et al., "The impact of faulty memory bit cells on the decoding of spatially-coupled LDPC codes," 2015 49th Asilomar Conference on Signals, Systems and Computers, Pacific Grove, CA, USA, 2015, pp. 1627-1631, doi:10.1109/ACSSC .2015.7421423. (Year: 2015).

* cited by examiner

MACHINE LEARNING ASSISTED QUALITY OF SERVICE (QOS) FOR SOLID STATE DRIVES

CROSS-REFERENCE TO RELATED APPLICATIONS

The present application claims priority to U.S. Provisional Patent Application Ser. No. 63/190,222 filed on May 18, 2021, the contents of which are incorporated by reference herein in their entirety.

BACKGROUND OF THE INVENTION

Fixed, deterministic Quality of Service (QoS) in Solid State Drives (SSDs) can be estimated at the time that a flash controller of the SSD is designed by utilizing simulations or pre-silicon emulations using a Field Programmable Gate Array (FPGA) programmable logic device. However, variable, probabilistic QoS cannot be fully addressed at the time that the flash controller is designed because it is strictly correlated with the use of the SSD. Variable, probabilistic QoS factors that affect QoS include non-deterministic user workloads such as multi-virtualized environments with multi-tenants, multiple NAND program suspend operations, and NAND read operations colliding with program operations and multiple queues.

One area where variable, probabilistic features can affect drive performance is in the command queue. Variable, probabilistic factors can result in one or more commands being loaded into the command queue, that when processed, have a latency greater than the maximum allowed latency for the SSD. Accordingly, there is a need for a method and apparatus that will allow for control of the effects of variable, probabilistic QoS factors on the commands in the command queue so as to allow for the QoS of the SSD to be maintained within predetermined tolerance requirements over the lifetime of the SSD.

SUMMARY OF THE INVENTION

A method for meeting QoS requirements in a flash controller includes receiving a configuration file for a QoS neural network at the memory controller, where the configuration file includes weight and bias values for the QoS neural network, then loading the configuration file for the QoS neural network into the neural network engine. A current command is received at the one or more instruction queue. Feature values corresponding to commands in the one or more instruction queues are identified and the identified feature values are loaded into the neural network engine. A neural network operation of the QoS neural network is performed in the neural network engine using as input to the neural network operation the identified feature values to predict latency of the current command. The predicted latency is compared to a first latency threshold; and when the predicted latency exceeds the first latency threshold one or more of the commands in the one or more instruction queues are modified. When the predicted latency does not exceed the latency threshold, the commands in the one or more instruction queues are not modified. A next command in the one or more instruction queue is performed.

A flash controller is disclosed that includes a write circuit, a decode circuit coupled to the write circuit, a program circuit, an erase circuit, a neural network circuit, a control circuit and an input and output (I/O) circuit. The I/O circuit is to receive a configuration file for a Quality of Service (QoS) neural network. The configuration file includes weight and bias values for the QoS neural network. The control circuit to load the configuration file of the QoS neural network into the neural network engine, to identify feature values corresponding to commands in the one or more instruction queues and to load the identified feature values into the neural network engine. The neural network engine to perform a neural network operation of the QoS neural network to predict latency of the current command, using as input to the neural network operation the identified feature values. The control circuit to compare the predicted latency to a first latency threshold, and when the predicted latency exceeds the first latency threshold, to modify one or more of the commands in the one or more instruction queues. The control circuit to not modify one or more of the commands in the in the one or more instruction queues when the predicted latency does not exceed the first latency threshold. One of the write circuit, the program circuit and the erase circuit to perform a next command in the one or more instruction queue.

By removing, reordering or rescheduling commands in the one or more command queue before the next command is performed, the method and apparatus of the present invention prevents commands from being executed that have unacceptable latency. Thereby control of variable, probabilistic factors (to the extent those factors affect the commands in the command queue) is achieved. Moreover, by removing, reordering or rescheduling commands in command queue that have unacceptable latency, the QoS of the SSD is maintained within the predetermined tolerance requirements for the SSD over the lifetime of the SSD.

BRIEF DESCRIPTION OF THE DRAWINGS

The accompanying drawings are included to provide a further understanding of the invention, and are incorporated in, and constitute a part of, this specification. The drawings illustrate various examples. The drawings referred to in this brief description are not drawn to scale.

DETAILED DESCRIPTION

Figure 1:
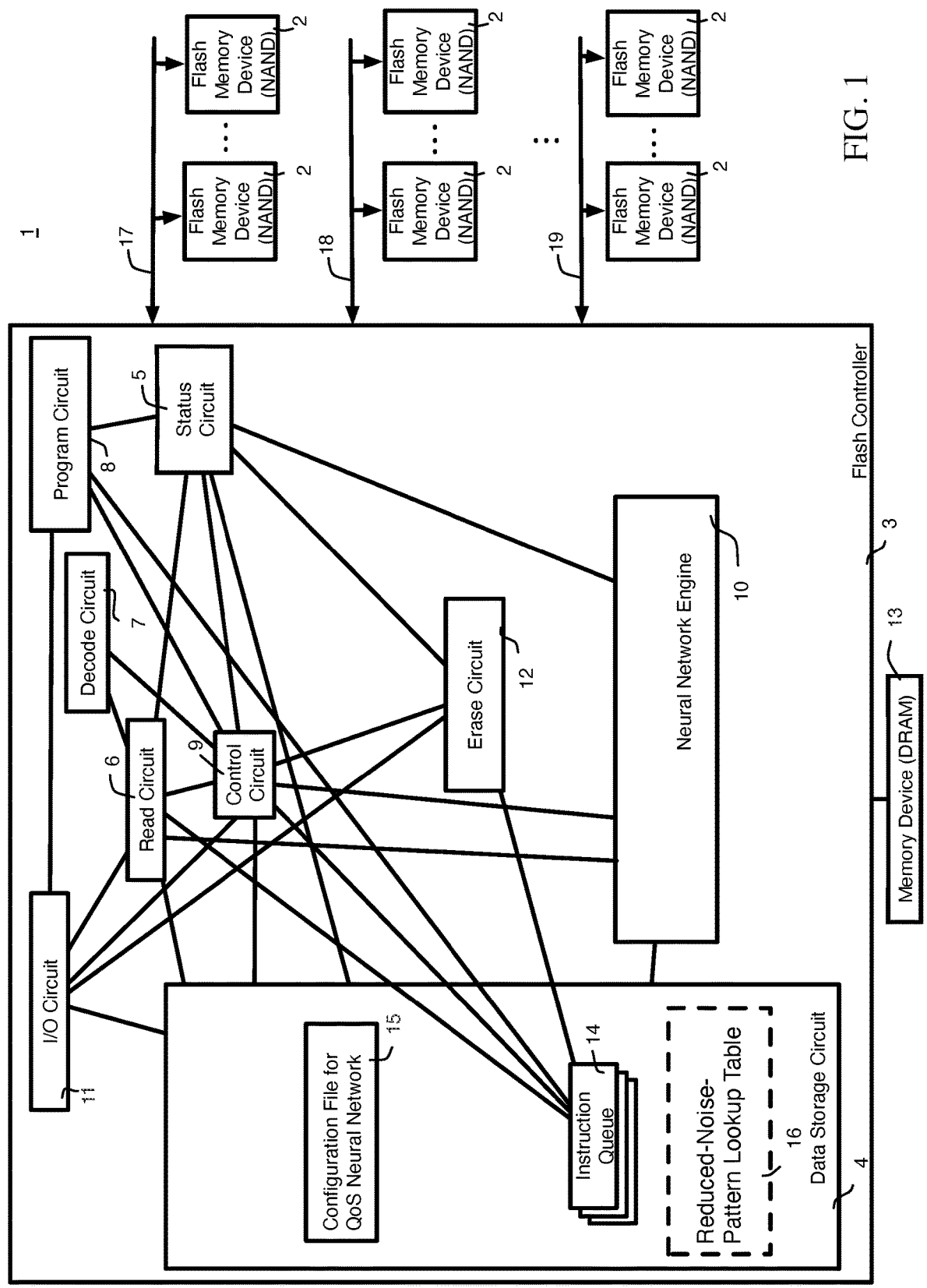
FIG. 1 is a diagram illustrating an SSD that includes a flash controller, a plurality of flash memory devices and a memory device.

FIG. 1 shows an SSD 1 that includes a flash controller 3, a plurality of flash memory devices 2 and a memory device 13. Flash controller 3 is coupled to flash memory devices 2 for storing data and for reading data from flash memory devices 2. In one example, the flash memory devices 2 are NAND devices and flash controller 3, flash memory devices 2 and memory device 13 are devices mounted to a circuit board (not shown). In one example, SSD 1 includes a plurality of flash packages, each flash package containing 8 flash memory die such that there are 8 die for each channel 17-19. Memory device 13 is a volatile memory device such as a Dynamic Random Access Memory (DRAM) that is electrically coupled to flash controller 3.

Flash controller 3 is an integrated circuit device that includes data storage circuit 4, status circuit 5, read circuit 6, decode circuit 7, program circuit 8, control circuit 9, neural network engine 10, instruction queue 14, input and output (I/O) circuit 11 and erase circuit 12. In one example, a plurality of instruction queues 14 are provided, and in one example one or more instruction queues 14 are contained within data storage circuit 4. Control circuit 9 is coupled to data storage circuit 4, status circuit 5, read circuit 6, decode circuit 7, program circuit 8, neural network engine 10, I/O circuit 11, erase circuit 12 and to one or more instruction queues 14. Decode circuit 7 is further coupled to read circuit 6. Status circuit 5 is further coupled to data storage circuit 4, read circuit 6, program circuit 8, neural network engine 10 and erase circuit 12. Read circuit 6 is further coupled to data storage circuit 4, neural network engine 10, I/O circuit 11 and to one or more instruction queues 14. Neural network engine 10 is further coupled to data storage 4. Erase circuit 12 is further coupled to one or more instruction queues 14. I/O circuit 11 is further coupled to data storage 4, program circuit 8 and erase circuit 12. Data storage circuit 4 further comprises a configuration file for QoS Neural Network 15 and optional reduced-noise-pattern lookup table 16.

Some or all of circuits 5-12, include circuits that are dedicated circuits for performing operations, and some or all of circuits 5-12 can be firmware that includes instructions that are performed on one or more processor for performing operations of flash controller 3, with the instructions stored in registers of one or more of circuits 5-12 and/or stored in data storage 4 or memory device 13. Some of all of circuits 5-12 include processors for performing instructions and instructions are loaded into flash controller 3 prior to operation of flash controller 3 by a user.

Instruction queue 14 is operable for storing instructions to be performed by read circuit 6, program circuit 8 and erase circuit 12. Though FIG. 1 illustrates a plurality of instruction queues 14 (e.g., an instruction queue for each of: high-priority instructions, medium priority instructions and low priority instructions), it is appreciated that alternatively, flash controller 3 can have a single instruction queue 14. The term "instruction queue" refers to a logical device or memory location that stores instructions to be performed by flash memory device 2, and can be a set of dedicated queues or memory locations in data storage circuit 4. Alternatively, some or all of the instructions in instruction queue(s) 14 can be stored in memory device 13.

I/O circuit 11 includes one or more circuit for coupling input into flash controller 3 and for coupling output from flash controller 3. Flash controller 3 is configured to receive read and write instructions from a host computer at I/O circuit 11, and to perform program operations, erase operations and read operations on memory cells of flash memory devices 2 to complete the instructions from the host computer. For example, upon receiving a write instruction from a host computer, I/O circuit 11 includes one or more circuit for receiving the write instruction and coupling the write instruction to program circuit 8. Program circuit 8 is operable to program codewords into on one or more of flash memory devices 2. Upon receiving a read command from the host computer, I/O circuit 11 receives the write instruction and couples the write instruction to read circuit 6. Read circuit 6 is operable to perform a read of flash memory device 2 by sending a read command to a flash memory device 2 that is to be read and decode circuit 7 is operable to decode the results from the read command. Erase circuit 12 is operable to erase memory locations in one or more of flash memory devices 2. Status circuit 5 is operable to track the status and the operations of flash controller 3 and flash memory devices 2. Data storage circuit 4 is a structure in flash controller 3 that is capable of storing data, and may include cache memory and/or static random-access memory (SRAM). Neural network engine 10 includes a specialized hardware module (e.g., a specialized configurable accelerator) specifically configured to perform a neural network operation.

Figure 2:
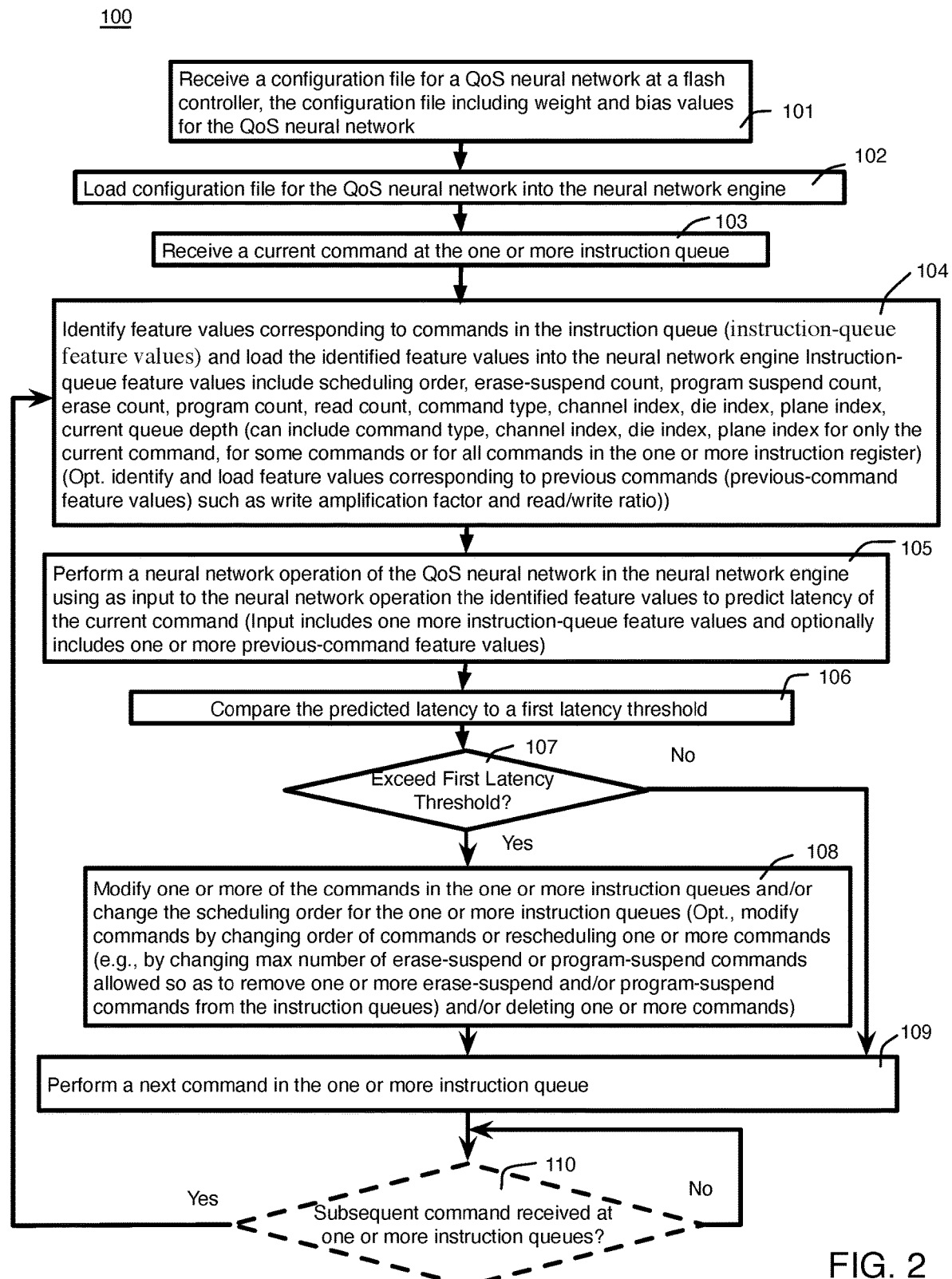
FIG. 2 is a diagram illustrating a method for meeting QoS requirements in a flash controller.

FIG. 2 illustrates a method (100) for meeting QoS requirements in a flash controller that includes receiving a configuration file for a QoS neural network at the flash controller (101), the configuration file including weight and bias values for the QoS neural network. The configuration file for the QoS neural network is loaded (102) into the neural network engine 10. In one example configuration file for a QoS neural network 15 is received at I/O circuit 11 and is stored in data storage 4, in memory device 13 and/or in a flash memory device 2. The term "configuration file for a QoS neural network," as used in the present application, includes any type of file specifying characteristics of a neural network configured to predict latency using as input characteristics of an instruction queue, including but not limited to a file indicating hyperparameters (weight and bias values) of a neural network that is configured to predict latency of a current command using as input characteristics of an instruction queue. Though the present example uses a single configuration file for each QoS neural network 15, it is appreciated that, alternatively, the QoS neural network could be represented by more than one configuration file. In one example, configuration file for a QoS neural network 15 includes a set of hyperparameters including weight and bias values. In one example the configuration file for a QoS neural network 15 also specifies the architecture of the particular QoS neural network such as, for example, the number of input neurons, number of output neurons, number of layers of hidden neurons, number of hidden neurons in each layer of hidden neurons and a type of activation function to be used.

Figure 3:
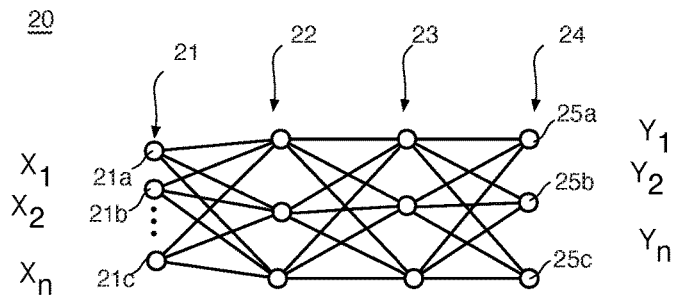
FIG. 3 is a block diagram illustrating a basic QoS neural network.

FIG. 3 illustrates a QoS neural network 20 that includes an input layer 21 that includes input neurons 21a-c, hidden layers 22-23 that include hidden neurons and an output layer 24 that includes output neurons 25a-25c. Inputs X1-Xn are received at respective input neurons 21a-21c and outputs Y1-Yn are output from output neurons 25a-25c. It is appreciated that QoS neural network 20 is an example and that many other combinations of input layer 21, hidden layers 22-23 and output layer 24 are possible, including layers with different connections between individual neurons, more hidden layers 22-23 and more or fewer neurons in each of the layers 21-24 of QoS neural network 20. For example, though QoS neural network 20 shows each neuron coupled to all of the neurons of the following layer, alternatively, each neuron in a particular layer is coupled to only some of the neurons in the following layer.

Continuing with FIG. 2, a current command is received at the one or more instruction queue (103). In the example shown in FIG. 1 I/O circuit 11 is operable to receive a command from a host computer and control circuit 9 is operable to store the received command in the instruction queue 14, the received command is then the current command. Alternatively, the current command is generated internally, with control circuit 9 operable to generate the current command and store the generated command in one of the instruction queues 14, which generated command is thus received at one of the instruction queues 14. Examples in which the current command is generated internally include instructions generated in connection with housekeeping operations such as garbage collection, wear leveling and block recycling. The term "current command", as used in the present application, is the command most recently stored in the one or more instruction queues.

Configuration file for a QoS neural network 15 is a configuration file for a neural network that uses features that correspond to characteristics of an instruction queue, that can be referred to as "instruction-queue features" for predicting latency of a current command in the instruction queue. Instruction-queue features include one or more of the following features that relate to the commands in the instruction queue at the time that current command is received at the instruction queue, and the scheduling order at the time that current command is received at the instruction queue, that may be referred to jointly as "current instruction queue features." Instruction queue features at the time that current command is received at the instruction queue may be referred to as "current instruction queue features". Instruction queue features include one or more of the following: a scheduling order, an erase-suspend count, a program-suspend count, an erase count, a program count, a read count, a command type, a channel index, a die index, a plane index, and a current queue depth, without limitation. Instruction-queue features can also include one or more features relating to commands that were previously in the instruction queue (previous-command features). The term previous-command features, as used in the present application, includes features relating to commands that were previously processed through the one or more instruction queue and specifically includes a write amplification factor and read/write ratio. The scheduling order indicates the order in which the commands are to be executed in all queues, such as, for example, First-In-First-Out (FIFO), Last-In-Last-Out (LIFO), Read-First, Program-First, Erase-First, Read-Program-Interleave. The erase-suspend count indicates the number or erase-suspend commands in the instruction queue that includes the current command. The program-suspend count indicates the number of program-suspend commands in the instruction queue that includes the current command. The erase count indicates the number of erase commands in the instruction queue that includes the current command. The program count indicates the number of program commands in the instruction queue that includes the current command. The read count indicates the number of read commands in the instruction queue that includes the current command. The command type indicates the type of command of the current command. The channel index indicates the channel associated with the current command (the channel that will be used to route the command to the flash memory device 2). The die index indicates the die associated with the current command (the flash memory device 2 die that will receive the command).

The plane index indicates the plane associated with the current command (the plane that will receive the command). In one example, flash memory devices 2 are divided into 2 or 4 planes, where each plane includes a fraction of the total number of blocks of the die. In one example, each flash memory device 2 has two planes and half of the blocks are on the first plane while the other half are on the second plane.

In one example the current instruction queue features include only the command type, channel index, die index associated with the current command. Alternatively, the current instruction queue features include the command type, channel index, die index and plane index of some or all of the other commands in the instruction queue.

The current queue depth indicates the number of commands in the instruction queue that contains the current command. The write amplification factor is a numerical value that represents the number of writes that the SSD has to perform (by commands coupled through the one or more instruction queue) in relation to the number of writes intended by the host computer. The read/write ratio is a numerical value that represents the number reads that the SSD has performed (by read commands coupled through the one or more instruction queue) in a given period divided by to the number of writes performed in the given period.

In one example, the configuration file for a QoS neural network 15 is generated by performing SSD characterization testing of a representative SSD that is the same type as SSD 1 (e.g., includes the same type of memory controller as flash controller 3 and the same type of memory devices as memory devices 2), to calculate latency of a current command in the instruction queue (e.g., the command most recently added to the instruction queue) during the testing, that is referred to hereinafter as the current-test-command. The conditions of each test to calculate latency of the current-test command are stored in a corresponding data record along with the calculated latency, with the conditions of the test that correspond to the current instruction queue features (and optionally previous-command features) referred to jointly as "test-feature values."

Figure 4:
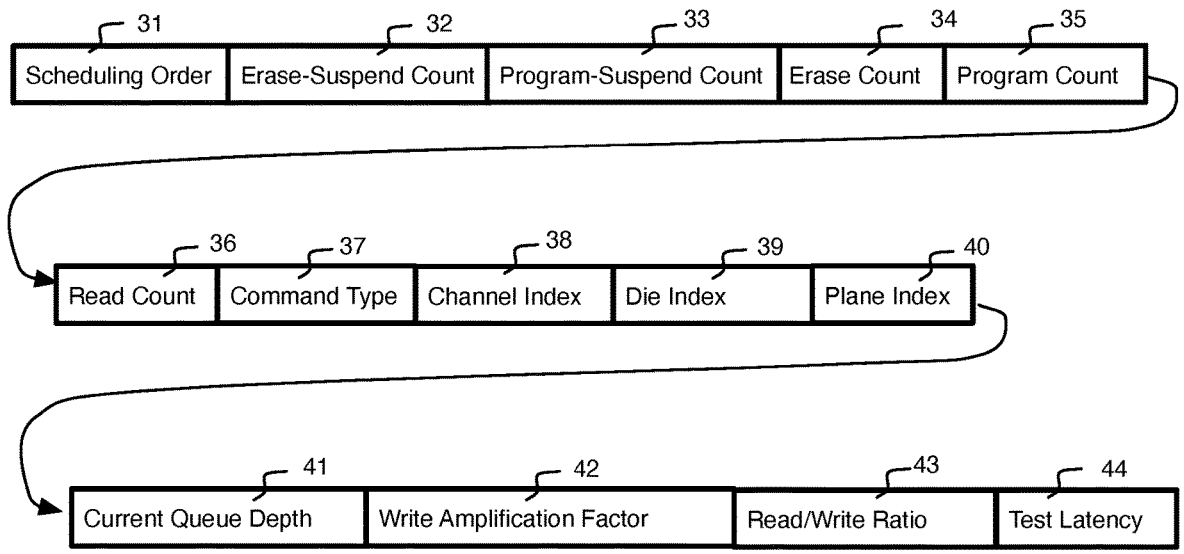
FIG. 4 is a block diagram illustrating a data record.

In one example that is illustrated in FIG. 4, each test generates a data record 30 that includes the following test-feature values: a scheduling order value 31 that indicates the scheduling order during the test, an erase-suspend count value 32 that indicates the number or erase-suspend commands in the instruction queue during the test, a program-suspend count value 33 that indicates the number or program-suspend commands in the instruction queue during the test, an erase count value 34 that indicates the number of erase commands in the instruction queue during the test, a program count value 35 that indicates the number of program commands in the instruction queue during the test, a read count value 36 that indicates the number of read commands in the instruction queue during the test, a command type value 37 that indicates the type of the current-test-command in the instruction queue during the test, a channel index value 38 that indicates the channel of the representative flash memory addressed by the current-test-command, a die index value 39 that indicates the individual representative flash memory addressed by the current-test-command, and a plane index value 40 that indicates the plane of the memory location addressed by the current-test-command. Current queue depth value 41 indicates the number of commands in the instruction queue that includes the current-test command during the test. This can be a total number of commands, or the number of commands of one or more particular type such as, for example the number of erase-suspend commands, program-suspend commands, erase commands, program commands and read commands. Write Amplification factor value 42 indicates the write amplification factor relating to the conditions of the test. Read/write ratio value 43 indicates the read/write ratio relating to the conditions of the test. Test latency 44 is the latency associated with the current-test-command that is determined by performing a test to determine the latency of the current test command, where the latency of the current test-command includes the latency of all commands in the one or more instruction register that are to be performed prior to the current command.

In one example, the testing generates data records 30 by using a variety of different standard workflow data sets to perform operations indicated by the instructions in the one or more instruction queues on all channels, die and planes, and using each type of scheduling order that flash controller 3 is capable of using. In one example, scheduling order types include FIFO, LIFO, Read-First (where read commands are performed first), Program-First (where program commands are performed first), Erase-First (where erase commands are performed first) and Read-Program-Interleaving (where read and program commands are interleaved and a read command is immediately followed by a corresponding program command). Testing can be performed at all possible erase-suspend count values, all possible program-suspend count values, all possible erase count values, all possible program count values, all possible read count values, one or more command type values (e.g., read, program, erase, erase-suspend, program-suspend commands, where other types of commands are disregarded). The testing uses a large number of addresses such that all possible channel index values, die index values, plane index values and current queue depth values are cycled through. Testing is further performed at different write amplification values and read/write ratios. In one example, the testing generates over 100,000 data records 30.

Figure 5:
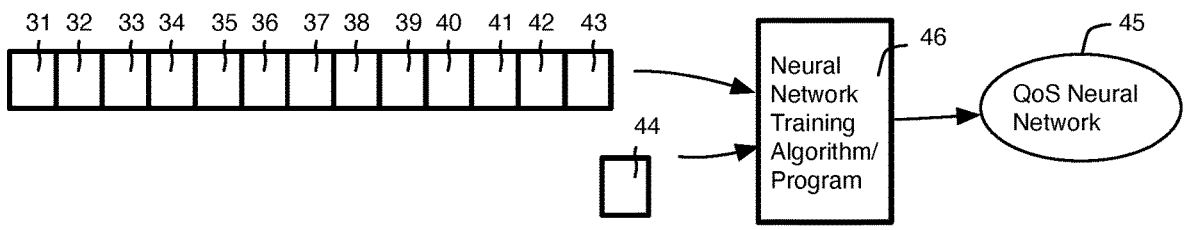
FIG. 5 is a block diagram illustrating a QoS neural network and the training of the QoS neural network.

In one example that is illustrated in FIG. 5 the QoS neural network 45 is trained by entering a training data set that includes values 31-43 from each data record 30 (excludes test latency 44) and a target data set that includes only test latency 44 into neural network training algorithm 46 (which may be a computer program operable on a general-purpose computer). Neural network training algorithm 46 is operable to perform training to generate QoS neural network 45. All data records 30 can be used for training (in which case all data records 30, with test latency 44 removed, make up a training data set). The training can use a stochastic gradient descent (SGD) training process, performed to achieve predetermined performance criteria (e.g., a min-squared error value). Alternatively, other types of training processes can be used such as, for example, an adaptive moment estimation (ADAM) training process.

In one example, some of data records 30 are used for validation and other data records 30 are used for testing, with the data records 30 used for validation referred to as a validation data set and the data records 30 used for testing referred to as a test data set. In this example, a deep neural network is generated and is trained using the training data set to predict latency using the calculated latency values as target values during the training. The resulting neural network is then validated using the validation data set and tested using the test data set. When the neural network passes testing (e.g., meets a predetermined root mean square (RMS) error value) the configuration file (or files) for the QoS neural network 45 are saved.

In one example, the training algorithm selects a set of training records (test dataset) and, when the training operation is completed, it computes the MSE (mean squared error) between the actual latency (i.e., the measured latency) and the predicted latency associated with the samples of the test dataset. If the MSE is below a defined value (e.g., 10-4) then the deep neural network passes the testing criteria and the trained model is saved. If the MSE is not below the defined value additional training records are added to the test dataset and the deep neural network is trained using the enlarged test dataset.

In the present example configuration file for a QoS neural network 15, i.e. configuration files for QoS neural network 45, is generated and saved. After assembly of SSD 1 configuration file for a QoS neural network 15 is loaded into SSD 1 (e.g., downloaded from a web server, received by I/O circuit 11 and stored onto data storage circuit 4 by I/O circuit 11 prior to delivery of SSD 1 to an end user).

Continuing with FIG. 2, feature values are identified that correspond to commands in the instruction queue (one or more instruction-queue feature values) and the identified instruction-queue feature values are loaded (104) into the neural network engine 10. In one example, control circuit 9 of FIG. 1 is configured to identify the feature values that correspond to commands in the instruction queue and couple the identified instruction-queue feature values to neural network engine 10. Optionally, one or more previous-command feature values are also identified and are loaded into the neural network engine 10 in step 104.

In one example the architecture of the neural network engine 10 is fixed, predetermined, or is otherwise established prior to starting method 100 and the configuration file received in step 101 includes only weight and bias values for the QoS neural network such the loading of step 102 requires only the loading of bias values and weighting values into neural network engine 10. Alternatively, neural network engine 10 includes configurable logic; the configuration file of the QoS neural network 15 indicates the number of input neurons, output neurons, connections between neurons and one or more activation functions to use; and neural network engine 10 is configured in accordance with the configuration file of the QoS neural network prior to performing step 102.

A neural network operation of the QoS neural network is performed (105) in the neural network engine 10 to predict latency of the current command. The neural network engine 10 uses as input to the neural network operation the identified feature values corresponding to commands in the instruction queues 14, i.e. the identified instruction-queue feature values, and optionally one or more previous-command feature values.

Figure 8:
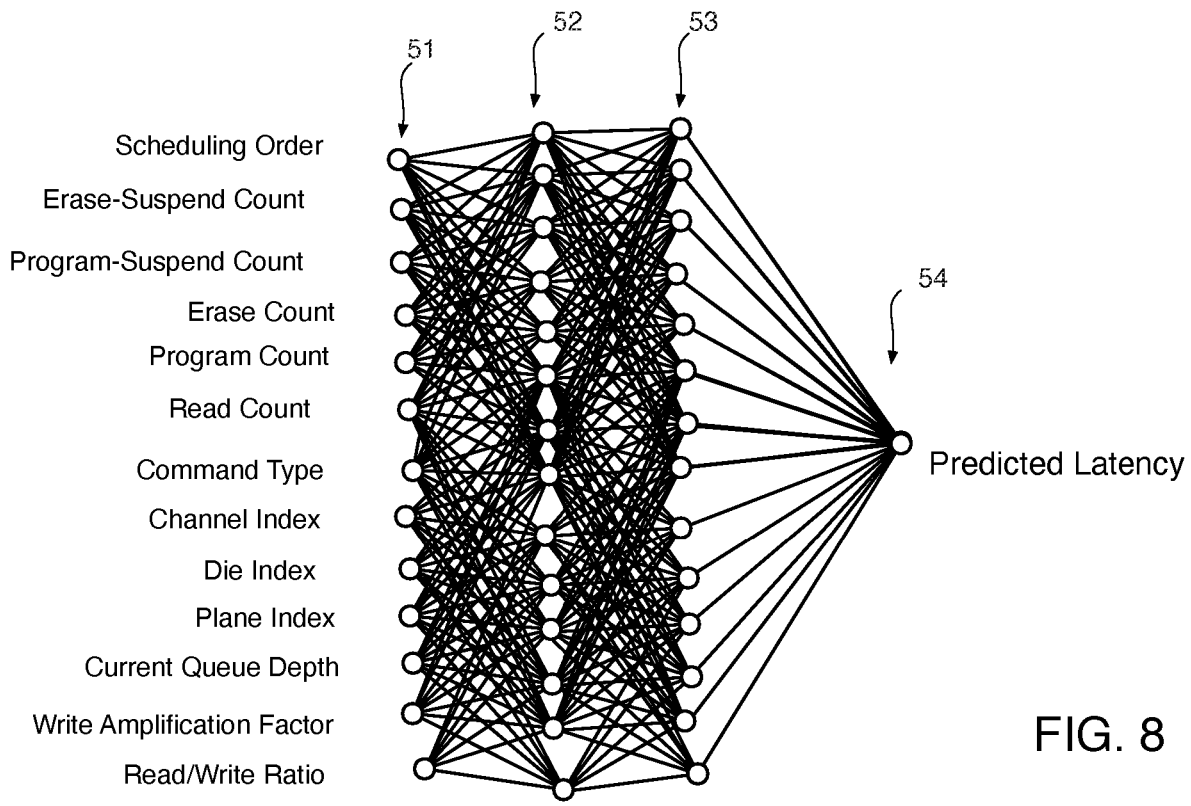
FIG. 8 is a block diagram illustrating a QoS neural network and inputs and outputs for a neural network operation of the QoS neural network in which instruction-queue feature values and two previous-command feature values (write amplification factor and a read/write ratio) are used as input to the neural network.

In one example that is illustrated in FIG. 8, a QoS neural network 50 includes an input layer 51 that includes input neurons, hidden layers 52-53 that include hidden neurons and an output layer 54 that includes a single output neuron.

In this example, the following feature values are identified and are loaded (104) into the neural network engine 10, and a neural network operation is performed using the identified feature values as input (105) at an input neuron of the input layer 51: a scheduling order value (Scheduling Order) that indicates the scheduling order for instruction queue 14, an erase-suspend count value (Erase-Suspend Count) that indicates the number or erase-suspend commands in instruction queue 14, a program-suspend count value (Program-Suspend-Count) that indicates the number or program-suspend commands in instruction queue 14, an erase count value (Erase Count) that indicates the number of erase commands in instruction queue 14, a program count value (Program Count) that indicates the number of program commands in instruction queue 14, a read count value (Read Count) that indicates the number of read commands in instruction queue 14, a command type value (Command Type) that indicates the type of the current command in instruction queue 14, a channel index value (Channel Index) that indicates the channel of the flash memory device 2 addressed by the current command, a die index value (Die Index) that indicates the individual flash memory device 2 addressed by the current command; a plane index value (Plane Index) that indicates the plane of the memory location addressed by the current command, a current queue depth (Current Queue Depth) that indicates the number of instructions in the instruction queue 14 that contains the current command; a write amplification factor (Write Amplification Factor) that indicates the difference between the number of write instructions received from a host computer and the number of program instructions performed by the SSD during a particular time interval; and a read/write ratio (Read/Write Ratio) that indicates the ratio of read commands to write (program) commands performed by the SSD during a particular time interval. Current Queue Depth, Write Amplification Factor and Read/Write Ratio are previous command feature values as they relate to commands that were previously in the instruction queue. In this example the neural network operation generates output at a single output neuron at output layer 50 indicating the predicted latency (Predicted Latency). In one example the predicted latency is the latency to complete the current command and includes the latency for performing all commands in the one or more instruction queue 14 that are scheduled to be performed prior to the current command.

Figure 9:
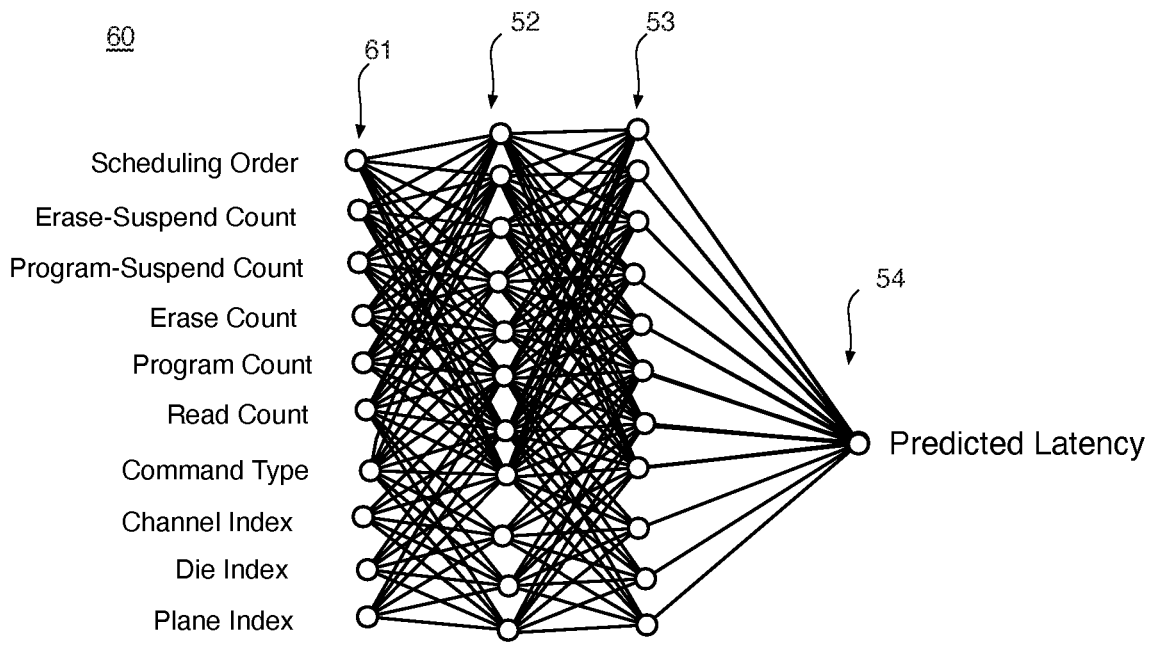
FIG. 9 is a block diagram illustrating a QoS neural network and inputs and outputs for a neural network operation of a QoS neural network in which only instruction-queue features are used as input to the neural network.
Figure 10:
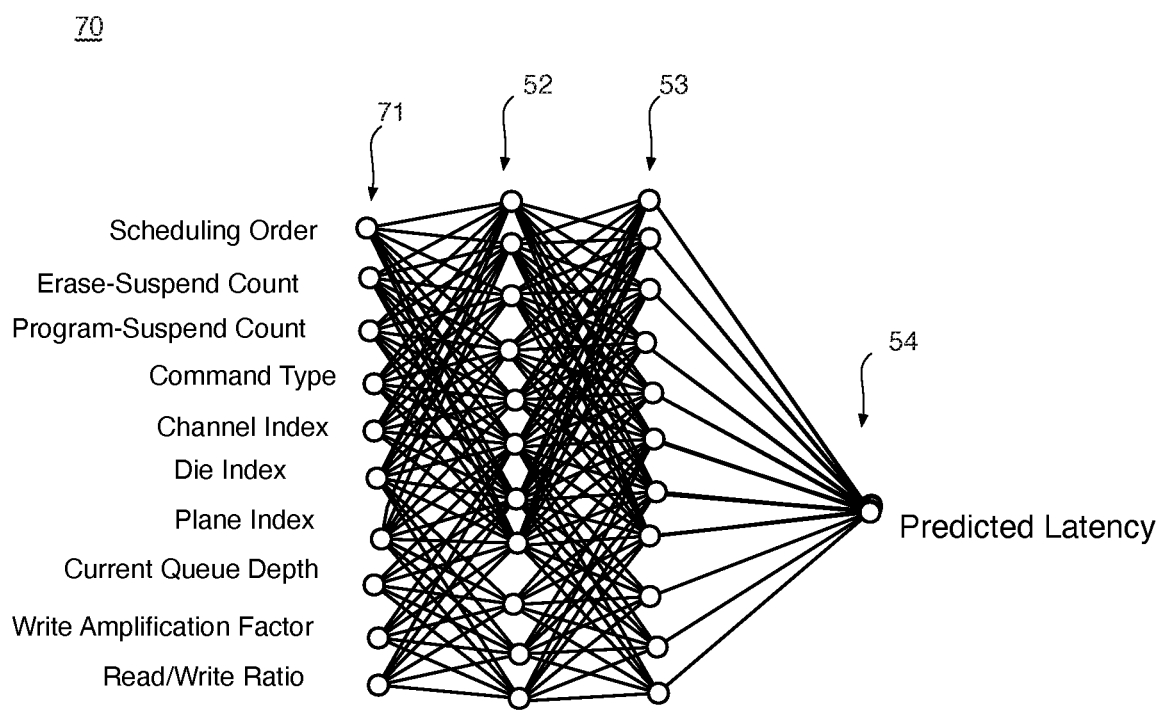
FIG. 10 is a block diagram illustrating a QoS neural network and inputs and outputs for a neural network operation of the QoS neural network in which instruction-queue features and two previous-command feature values (write amplification factor and a read/write ratio) are used as input to the neural network operations, where the instruction-queue features do not include Erase Count, Program Count and Read Count.

Many other combinations of feature values are possible. FIG. 9 shows an example in which the feature values of neural network 60 only include instruction-queue feature values (previous-command feature values are not input) and in which the input neurons 61 do not include input neurons for receiving previous-command feature values, particularly Write Amplification Factor and Read/Write Ratio. Furthermore, not all instruction-queue features need to be used. FIG. 10 shows an example in which the feature values input into neural network 70 do not include Erase Count, Program Count or Read Count, and in which the input neurons 71 do not include input neurons for receiving Read Count, Erase Count or Program Count, but the input neurons 71 do include previous-command feature values, particularly Write Amplification Factor and Read/Write Ratio.

The predicted latency is compared (106) to a first latency threshold. In FIG. 1 control circuit 9 is configured to compare the predicted latency to the first latency threshold. In one example, the first latency threshold is a latency threshold that corresponds to the QoS specified for SSD 1. In one example the first latency threshold is 4 milliseconds. Patterns of commands that exceed the first latency threshold may be referred to as "noisy patterns." The term "noisy pattern," as used in the present application, is a pattern of commands in one or more instruction queue that is determined to have a latency that exceed a particular latency threshold, and specifically includes a pattern of commands that exceed the first latency threshold corresponding to the required QoS for the SSD 1.

When the predicted latency exceeds the first latency threshold, the commands in the one or more instruction queues are modified or the scheduling order for the one or more instruction queues is modified (108). In FIG. 1, control circuit 9 is operable to modify one or more of the commands in the one or more instruction queues or modify the scheduling order for the one or more instruction queues. The modifying one or more of the commands can include: changing the order of the commands in the instruction queue, removing one or more of the commands from one or more instruction queues by rescheduling one or more command in the one or more instruction queues (e.g., rescheduling one or more erase-suspend commands and/or rescheduling one or more program-suspend commands) and/or removing one or more of the commands in the instruction queues by deleting the one or more commands. The one or more commands can be deleted when SSD 1 is operable to do "smart" garbage collection, with garbage collection commands tagged as "background commands" such that, if a higher priority command arrives in the instruction queue 14 and all the slots are occupied by garbage collection commands, control circuit 9 is operable to delete one or more garbage collection commands from the one or more instruction queue 14 to leave space for the user commands and control circuit 9 can reschedule the deleted garbage collection commands at a later time (e.g., when the SSD 1 goes into idle).

Rescheduling one or more erase suspend commands may be achieved by changing (reducing) the maximum number of erase-suspend commands allowed, which results in one or more erase-suspend commands being rescheduled (the rescheduling is operable to remove one or more erase-suspend command from the one or more instruction queue). Rescheduling one or more program-suspend commands may be achieved by changing the maximum number of program-suspend commands allowed, which results in one or more program-suspend commands being rescheduled (where the rescheduling is operable to remove one or more program-suspend command from the one or more instruction queue). The modifying of step 108 modifies the commands such that the modified commands do not exceed the first latency threshold. In one example, step 108 includes modifying the commands and then testing the modified commands in order to make sure that the modified commands do not exceed the first latency threshold.

Figure 6:
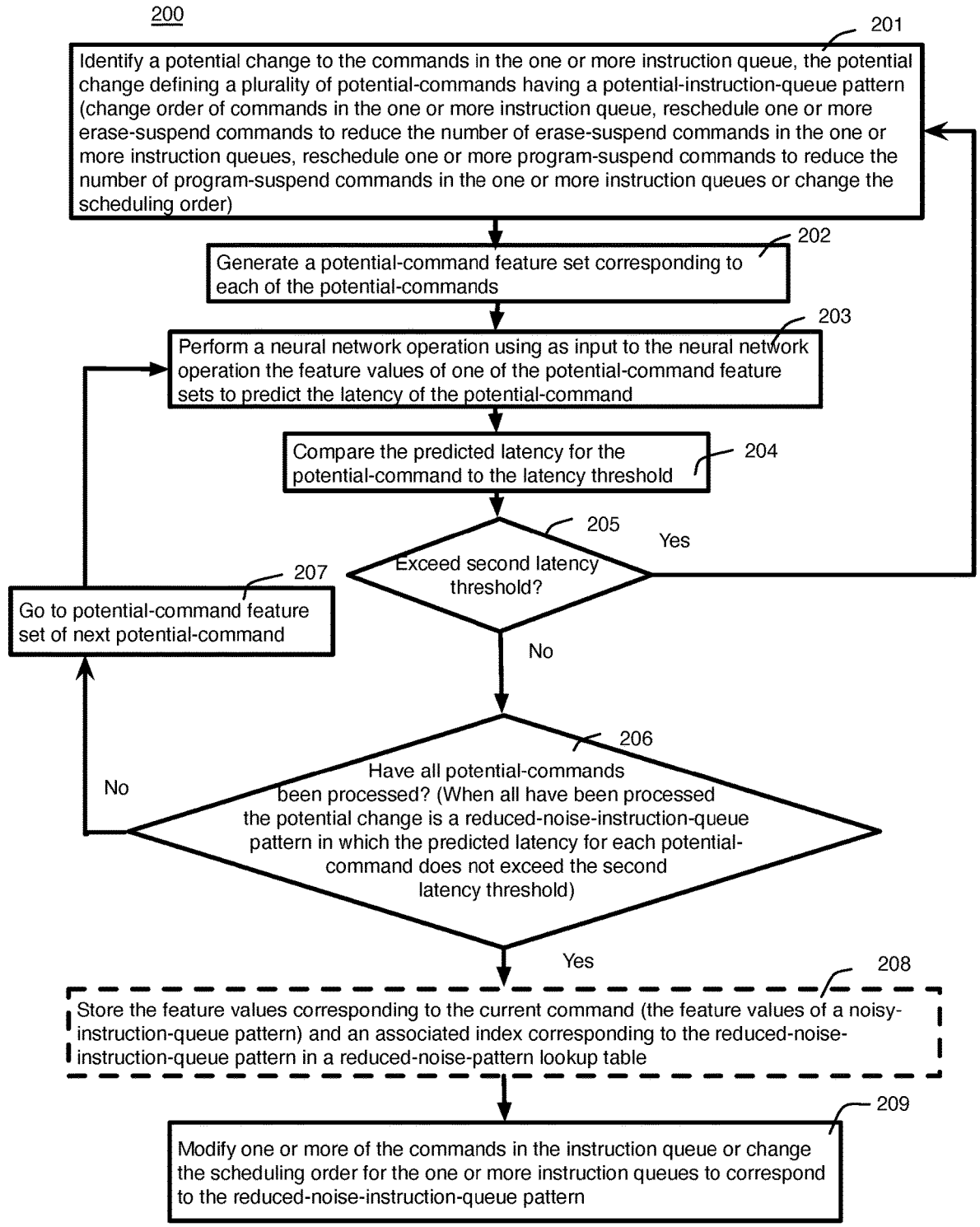
FIG. 6 is a diagram illustrating a method for performing step 108 of the method of FIG. 2 in which an iterative process is used to modify the commands in the instruction queue.

FIG. 6 illustrates a method 200 for performing step 108 of FIG. 2 in which the commands in the instruction queue are modified using an iterative process. A potential change to the commands in the one or more instruction queues is identified (201). The potential change defines a plurality of potential-commands having a potential-instruction-queue pattern.

In one example, in each iteration of step 201 the order of the commands in the one or more instruction queues is changed, erase-suspend commands in the one or more instruction queues are rescheduled (e.g., by changing the maximum allowed number of erase-suspend commands to reduce the number of erase-suspend commands in the one or more instruction queue 14), the program-suspend commands in the one or more instruction queues are rescheduled (e.g., by changing the maximum allowed number of program-suspend commands to reduce the number of erase-suspend commands in the one or more instruction queue), or the scheduling order for the one or more instruction queues is changed to a different scheduling order. In FIG. 1 control circuit 9 is configured to identify a potential change to the commands in the instruction queue by: changing the order of the one or more commands in the instruction queue; by reducing the number of erase-suspend commands in the one or more instruction queue (e.g., by changing the maximum allowed number of erase-suspend commands); by reducing the number of program-suspend commands in the one or more instruction queue (e.g., by changing the maximum allowed number of program-suspend commands); or by changing the scheduling order for the one or more instruction queues to a different scheduling order.

A potential-command feature set is generated (202) corresponding to each of the potential-commands. In FIG. 1 control circuit 9 is operable to generate a potential-command feature set corresponding to each of the potential commands. Thus, if there is a single instruction queue with 10 commands in it, multiple potential-command feature sets will be generated, each of which can have the same features as one of neural networks 50, 60 or 70 of FIGS. 8-10. The command feature set is considered a "potential" command feature set since you don't know if the modification you have performed on that particular command feature set will generate an acceptable latency.

A neural network operation is performed (203). The neural network operation uses as input the feature values of one of the potential-command feature sets to predict the latency for the corresponding potential-command. In FIG. 1 neural network engine 10 is configured to perform a neural network operation, using as input the feature values of one of the potential-command feature sets, to predict the latency for the corresponding potential-command.

Predicted latency for the potential-command is compared (204) to a second latency threshold. The second latency threshold may be the same as the first latency threshold. However, a lower latency threshold than the first latency threshold can also be used. In FIG. 1 control circuit 9 is configured to compare the predicted latency for the potential-command to the latency threshold. When the predicted latency for the potential-command exceeds the latency threshold (205), steps 201-204 are repeated until a potential change is identified in which all potential-commands (the potential-commands from the most recent potential change of step 201) do not exceed the latency threshold (the potential change then defines one or more reduced noise instruction queue patterns).

In FIG. 1 control circuit 9 is configured to repeat identifying the potential change to the commands in the instruction queue (201) and repeat generating a potential-command feature set (202) corresponding to each of the potential commands. Neural network engine 10 is configured to repeat the performing a neural network operation (203) using as input to the neural network operation the feature values of one of the potential-command feature sets to predict the latency for the corresponding potential-command. Control circuit 9 is configured to repeat the comparing (204) predicted latency for the potential-command to the latency threshold and to go to the potential-command feature set of the next potential-command (207) until all potential-commands have been processed. so as to identify a reduced-noise-instruction-queue pattern. This occurs when a potential change is found in which the predicted potential-latency of all of the potential-commands for the respective potential change do not exceed the second latency threshold. It can be seen that, the iterations of method 200 proceeds until the first potential change is found that works (because the respective potential-change does not negatively affect latency (e.g., by one or more command in the potential-change exceeding the second latency threshold)). The term "reduced-noise-instruction-queue pattern" as used in the present application is a pattern of commands in one or more instruction queue that corresponds to a noisy pattern and that that has a latency that is less than the latency of the corresponding noisy pattern; and specifically includes a pattern of commands in an instruction queue that is the same as the pattern of the corresponding noisy pattern except that: one or more program-suspend and/or erase-suspend commands have been rescheduled; the order of the commands in the one or more instruction queue has been changed; and/or the scheduling order for the one or more instruction queue has been changed such that the predicted potential-latency for each of the potential-commands in the reduced-noise-instruction-queue pattern do not exceed the second latency threshold.

Optionally feature values corresponding to noisy patterns and associated values corresponding to reduced-noise-instruction-queue patterns are numeric values and/or alphanumeric values stored in a reduced-noise-pattern lookup table 16 (208). In one example, reduced-noise-pattern lookup table 16 includes feature values corresponding to some or all of the features of the noisy pattern identified in step 201 (e.g., a set of features corresponding to the noisy pattern) and a value corresponding to the reduced-noise-instruction-queue pattern identified in step 206 (e.g., a reduced-noise pattern index).

The commands in the instruction queue are modified or the scheduling order in the one or more instruction queues is changed (209) to correspond to the reduced-noise-instruction-queue pattern. In FIG. 1 control circuit 9 is configured to modify one or more of the commands in the instruction queue or change the scheduling order to correspond to the reduced-noise-instruction-queue pattern. In one example of step 209, the same changes made in the last iterations of step 201 are made to the commands in the instruction queue in step 209. More particularly, when step 201 reschedules one or more erase-suspend commands, in step 209 control circuit 9 is operable to reschedule the same number of erase-suspend commands. When step 201 reschedules one or more program-suspend commands, in step 209 control circuit 9 is operable to reschedule the same number of program-suspend commands. When step 201 changes the order of one or more commands, in step 209 control circuit 9 is operable to make the same change to the order of the commands in the one or more instruction queues 14. When the iterations of step 201 changes the scheduling order, in step 209 control circuit 9 is operable to make the same change to the scheduling order for the one or more instruction queues 14. More particularly, when the last iteration of step 201 changes the scheduling order to FIFO, in step 209 control circuit 9 is operable to change the scheduling order for the one or more instruction queues 14 to FIFO. When the last iteration of step 201 changes the scheduling order to LIFO, in step 209 control circuit 9 is operable to change the scheduling order for the one or more instruction queues 14 to LIFO. When the last iteration of step 201 changes the scheduling order to Read-First, in step 209 control circuit 9 is operable to change the scheduling order for the one or more instruction queues 14 to Read-First. When the last iteration of step 201 changes the scheduling order to Program-First, in step 209 control circuit 9 is operable to change the scheduling order for the one or more instruction queues 14 to Program-First. When the last iteration of step 201 changes the scheduling order to Erase- First, in step 209 control circuit 9 is operable to change the scheduling order for the one or more instruction queues 14 to Erase-First. When the last iteration of step 201 changes the scheduling order to Read-Program-Interleaving, in step 209 control circuit 9 is operable to change the scheduling order for the one or more instruction queues 14 to Read-Program-Interleaving.

A next command in the one or more instruction queues is performed (109). In the present example step 108 is performed prior to step 109. In FIG. 1 control circuit 9 is configured to generate an indication that a next instruction is to be performed, and is configured to couple the indication to one or more of read circuit 6, program circuit 8 and erase circuit 12. When the next command is a read command the next command is performed by read circuit 6. When the next command is a program command the next command is performed by program circuit 8. When the next command is an erase command the next command is performed by erase circuit 12. Because any noisy pattern in the one or more instruction queue 14 is changed to a reduced-noise-instruction-queue pattern prior to performing the next command in the one or more instruction queue 14, performance of a command that would have resulted in a latency that is greater than the acceptable threshold is avoided, maintaining SSD 1 within required the required QoS specification for SSD 1.

Steps 104-109 are optionally repeated (110) each time a subsequent command is received in the instruction queue. In the repeating of steps 104-109, step 108 is only repeated when the predicted latency exceeds the first latency threshold.

In one example the reduced-noise-pattern lookup table 16 stored in FIG. 1 is originally empty and each time method 200 identifies a new noisy pattern and corresponding reduced-noise-instruction-queue pattern, feature values corresponding to noisy patterns and associated feature values corresponding to reduced-noise-instruction-queue patterns are stored in the reduced-noise-pattern lookup table 16 so that the next time that a noisy pattern reoccurs the corresponding reduced-noise-instruction-queue pattern identified in method 200 can be quickly and easily identified, without having to repeat the iterative process of method 200.

Figure 7:
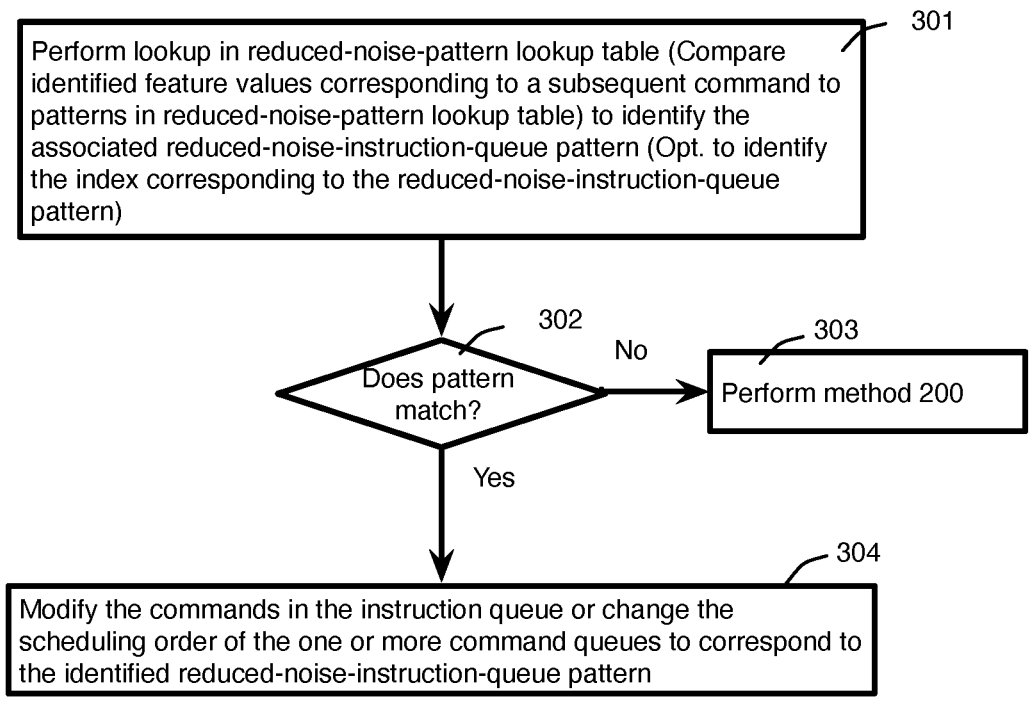
FIG. 7 is a diagram illustrating a method for performing step 108 of the method of FIG. 2 in which a reduced-noise-pattern lookup table is used.

FIG. 7 illustrates an example of step 108 of FIG. 2 in which reduced-noise-pattern lookup table 16 is used to identify the reduced-noise-instruction-queue pattern to use to modify one or more of the commands in the instruction queue. More particularly, in method 300, the commands in the instruction queue are modified by performing a lookup in the reduced-noise-pattern lookup table 16 (301) using the some or all of the feature values to identify the corresponding reduced-noise-instruction-queue pattern. If the pattern matches (302, 304) the commands in the instruction queue are modified (304) to correspond to the one or more identified reduced-noise instruction queue patterns. If the pattern does not match method 200 is performed (303). In FIG. 1, control circuit 9 is configured to perform a lookup in the reduced-noise-pattern lookup table 16 (301) using some or all of the feature values identified in step 104 to identify the corresponding reduced-noise-instruction-queue pattern, and when the pattern matches modify the commands in the instruction queue to correspond to the identified reduced-noise-instruction-queue pattern.

In one example of method 300, reduced-noise-pattern lookup table 16 includes feature values corresponding to a noisy pattern (including: scheduling order, erase-suspend count, program-suspend count, erase count, program count, read count, command type, channel index, die index, plane index, current queue depth, write amplification factor and read/write ratio) and a corresponding reduced-noise-pattern index. The reduced-noise-pattern index indicates one or more of the following: that one or more erase-suspend commands are to be rescheduled (e.g., by indicating a erase-suspend command limit); that one or more program-suspend commands are to be rescheduled (e.g., by indicating a program-suspend command limit); a particular change to the order of the commands in one or more instruction queue; that scheduling order is to be changed to FIFO; that scheduling order is to be changed to LIFO; that scheduling order is to be changed to Read-First; that scheduling order is to be changed to Program-First; that scheduling order is to be changed to Erase-First; or that scheduling order is to be changed to Read-Program-Interleaving.

In this example, in step 209 the commands in the instruction queue are modified as indicated by the reduced-noise-pattern index. For example, when the reduced-noise-pattern index indicates that one or more erase-suspend command is to be rescheduled control circuit 9 is operable to change the erase-suspend command limit (reducing the maximum number of erase-suspend commands allowed) to reschedule the one or more erase-suspend command (e.g., thereby removing one or more erase-suspend commands from the one or more instruction queue). When the noisy-pattern index indicates that one or more program-suspend command is to be rescheduled control circuit 9 is operable to change the program-suspend command limit (reducing the maximum number of program-suspend commands allowed) to reschedule the one or more program-suspend command (e.g., thereby removing one or more program-suspend commands from the one or more instruction queue). When the noisy-pattern index indicates that scheduling order is to be changed to FIFO, control circuit 9 is operable to change the scheduling order to FIFO. When the noisy-pattern index indicates that scheduling order is to be changed to LIFO, control circuit 9 is operable to change the scheduling order to LIFO. When the noisy-pattern index indicates that scheduling order is to be changed to Read-First control circuit 9 is operable to change the scheduling order to Read-First. When the noisy-pattern index indicates that scheduling order is to be changed to Program-First control circuit 9 is operable to change the scheduling order to Program-First. When the noisy-pattern index indicates that scheduling order is to be changed to Erase-First control circuit 9 is operable to change the scheduling order to Erase-First. When the noisy-pattern index indicates that scheduling order is to be changed to Read-Program-Interleaving control circuit 9 is operable to change the scheduling order to Read-Program-Interleaving.

Flash controller 3 is operable to analyze every set of commands entered into the one or more instruction queues 14 and to identify, using neural network engine 10 and methods 100, 200 and 300 when the set of commands in instruction queue 14 will impact QoS (when the predicted latency will exceed the QoS latency threshold), and is operable to modify (step 108) one or more of the commands in instruction queue 14 before the next command in the instruction queue 14 is performed, preventing the pattern of commands in instruction queue 14 from being performed that would have impacted QoS.

In one example, only commands having a command type that significantly contributes to latency are considered and other types of commands are disregarded. By only considering those commands that significantly contribute to latency faster processing is achieved (since the types of commands that do not significantly contribute to latency need not be processed). In one example the user can specify what commands are considered. FIG. 10 illustrates QoS neural network 70 in which only program-suspend and erase-suspend commands are considered and other types of commands are disregarded (e.g., read commands, program commands and erase commands in the instruction queue are disregarded). In one example, the user (or the fabricator of the SSD) can select between one of two modes: a first mode in which program-suspend, erase-suspend, program, erase and read command types are considered (e.g., neural network 50) and all other commands are disregarded, and a second mode in which only program-suspend, erase-suspend, command types are considered (e.g., neural network 70) and all other commands are disregarded.

Figure 11:
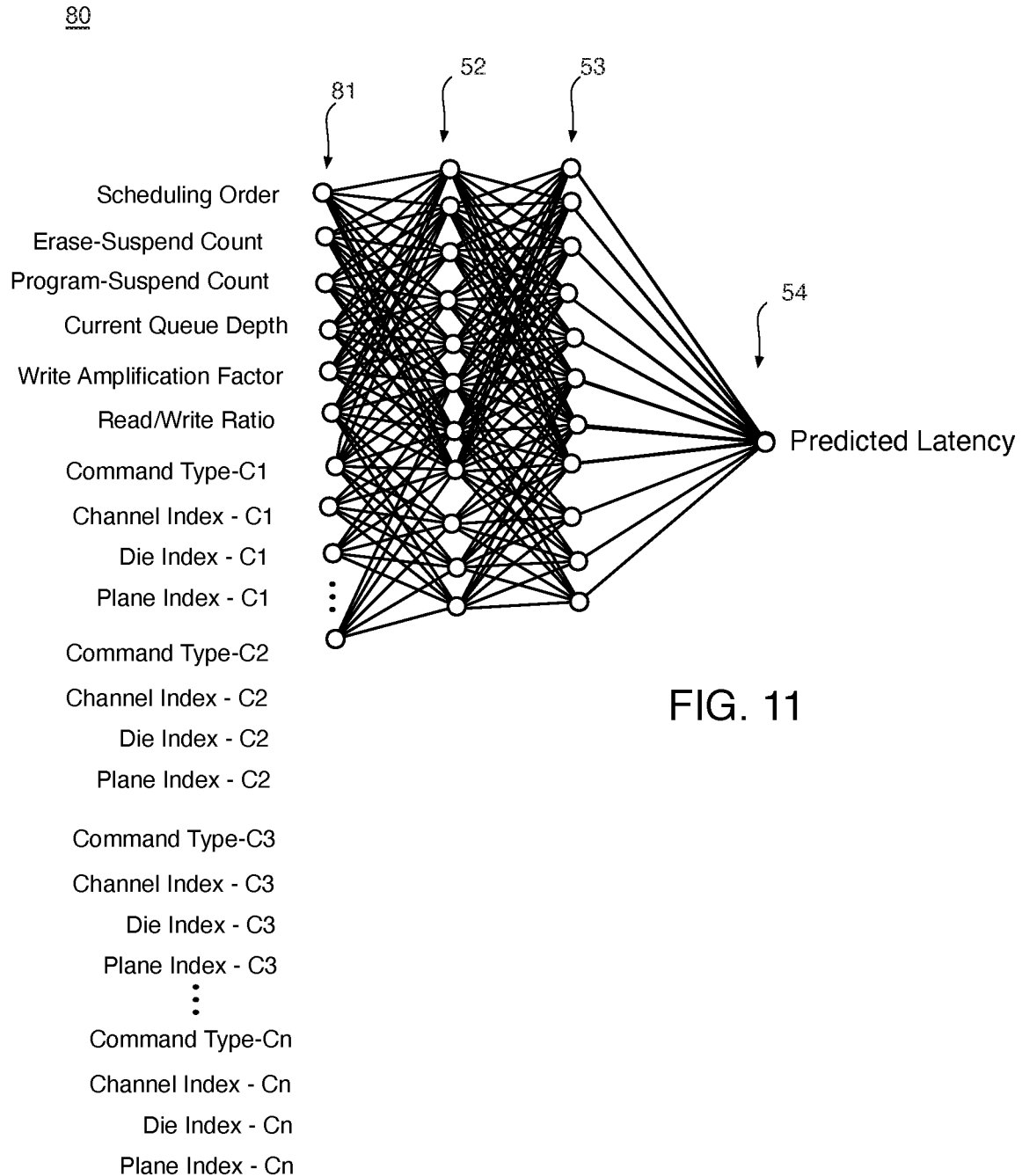
FIG. 11 is a block diagram illustrating a QoS neural network and inputs and outputs for a neural network operation in which instruction-queue features include input neurons corresponding to the command type, the channel index, the die index and the plane index of n commands.

In one example that is illustrated in FIG. 11 the current instruction queue features include the command type, channel index, die index and plane index of some all of the commands in the instruction queue. In one specific example, the current instruction queue features include the command type, channel index, die index and plane index of all of the commands in the instruction queue such that the input neurons 81 of the neural network 80 include input neurons corresponding to the command type, the channel index, the die index and the plane index of all of the commands in the one or more instruction queue.

Input neurons 81 include input neurons relating to a first command (C1), which may be the current command, including the command type (Command Type—C1), channel index (Channel Index—C1), die index (Die Index—C1) and plane index (Plane Index C1) of the first command. Input neurons 81 include input neurons relating to a second command (C2), including the command type (Command Type-C2), channel index (Channel Index—C2), die index (Die Index—C2) and plane index (Plane Index—C2) of C2. Input neurons 81 include input neurons relating to a third command (C3), including the command type (Command Type-C3), channel index (Channel Index—C3), die index (Die Index—C3) and plane index (Plane Index—C3) of C3, and so forth, including input neurons 81 relating to a $n^{th}$ command (Cn), including the command type (Command Type-Cn), channel index (Channel Index—Cn), die index (Die Index—Cn) and plane index (Plane Index—Cn) of the $n^{th}$ command.

In one example n is equal to the total number of commands in the one or more instruction queues. Alternatively, n is equal to the total number of commands of the one or more command type that is monitored.

In one example, n is equal to the number of program-suspend and erase-suspend commands and QoS neural network 80 includes neurons corresponding to command type, channel index, die index and plane index for all program-suspend and erase-suspend commands in the one or more instruction queue. In another example, n is equal to the number of program-suspend, erase-suspend, program and erase commands and QoS neural network 80 includes neurons corresponding to command type, channel index, die index and plane index for all program-suspend, erase-suspend, program and erase commands in the one or more instruction queue. In another example, n is equal to the number of program-suspend, erase-suspend, program, erase and read commands and QoS neural network 80 includes neurons corresponding to command type, channel index, die index and plane index for all program-suspend, erase-suspend, program, erase and read commands in the one or more instruction queues. By removing, reordering or rescheduling commands in the one or more command queues before the next command is performed, the method and apparatus of the present invention prevents commands from being executed that have unacceptable latency. Thereby control of variable, probabilistic factors (to the extent those factors affect the commands in the command queue) is achieved. Moreover, by removing, reordering or rescheduling commands in command queue that have unacceptable latency, the QoS of the SSD is maintained within the predetermined tolerance requirements for the SSD over the lifetime of the SSD.

In the description, for purposes of explanation, numerous specific details are set forth in order to provide a thorough understanding of the present invention. It will be evident, however, to one of ordinary skill in the art that the present invention may be practiced without these specific details. In some instances, well-known structures and devices are shown in block diagram form, rather than in detail, in order to avoid obscuring the present invention. These embodiments are described in sufficient detail to enable those of ordinary skill in the art to practice the invention, and it is to be understood that other embodiments may be utilized and that logical, mechanical, electrical, and other changes may be made without departing from the scope of the present invention.

The invention claimed is:

1. A method for meeting quality of service (QoS) requirements in a flash controller that includes one or more instruction queues and a neural network engine, the method comprising:
   receiving a configuration file for a QoS neural network at the flash controller, the configuration file including weight and bias values for the QoS neural network;
   loading the configuration file for the QoS neural network into the neural network engine;
   receive a current command at the one or more instruction queue;
   identifying feature values corresponding to commands in the one or more instruction queues and loading the identified feature values into the neural network engine;
   performing a neural network operation of the QoS neural network in the neural network engine using as input to the neural network operation the identified feature values to predict latency of the current command, wherein the predicted latency of the current command is the latency to complete the current command and includes the latency for performing all commands in the one or more instruction queues that are scheduled to be performed prior to the current command;
   comparing the predicted latency to a first latency threshold;
   when the predicted latency exceeds the first latency threshold
      identifying a potential to the commands in the one or more instruction queues, the potential change defining a plurality of potential-commands;
      generating potential-command feature sets corresponding to respective potential-commands;
      performing neural network operations using as input to the respective neural network operations feature values of the generated potential-command feature sets to predict a respective potential-latency of the respective potential-commands and comparing the predicted respective potential latency of the respective potential-commands to a second latency threshold to identify a reduced-noise-instruction-queue pattern, and
      modifying one or more of the commands in the one or more instruction queues or changing a scheduling order in the one or more instruction queues to correspond to the reduced-noise-instruction-queue pattern;

when the predicted latency does not exceed the latency threshold, not modifying the commands in the one or more instruction queues; and performing a next command in the one or more instruction queues.

2. The method of claim 1 wherein the identifying feature values comprises identifying a scheduling order value that indicates the order in which the commands are to be executed in the one or more instruction queues.

3. The method of claim 1 wherein the feature values comprise an erase-suspend count that indicates the number of erase-suspend commands in the one or more instruction queues and a program-suspend count indicating the number of program-suspend commands in the one or more instruction queues.

4. The method of claim 1 wherein the feature values include an erase count indicating the number of erase commands in the one or more instruction queues and a program count indicating the number of program commands in the one or more instruction queues and a read count indicating the number of read commands in the ore or more instruction queues.

5. The method of claim 1 wherein the feature values comprise a channel index, a die index and a plane index, that respectively indicate the channel, die and plane of the current command.

6. The method of claim 1 wherein the modifying one or more of the commands in the one or more instruction queues comprises changing the order of the commands in the one or more instruction queues, or deleting one or more commands in the one or more instruction queues.

7. The method of claim 6 wherein the modifying one or more of the commands in the one or more instruction queues is performed prior to the performing the next command.

8. The method of claim 1 wherein the second latency threshold is equal to the first latency threshold.

9. The method of claim 1, comprising storing the feature values corresponding to the current command and an associated index corresponding to the reduced-noise-instruction-queue pattern in a lookup table.

10. The method of claim 9 comprising:

performing a lookup in the lookup table using feature values corresponding to a subsequent command having a latency that exceeds the first latency threshold to identify a respective reduced-noise-instruction-queue pattern associated with the subsequent command and wherein the modifying one or more of the commands in the instruction queues or changing the scheduling order comprises modifying one or more of the commands in the one or more instruction queues or changing the scheduling order to correspond to the reduced-noise-instruction-queue pattern associated with the subsequent command.

11. A flash controller including a write circuit, a decode circuit coupled to the write circuit, a program circuit and an erase circuit, the flash controller comprising:

a neural network engine;

an input and output (I/O) circuit to receive a configuration file for a Quality of Service (QoS) neural network, the configuration file including weight and bias values for the QoS neural network; and a control circuit to load the configuration file of the QoS neural network into the neural network engine, to identify feature values corresponding to commands in one or more instruction queues and to load the identified feature values into the neural network engine, the neural network engine to perform a neural network operation of the QoS neural network to predict latency of a current command, using as input to the neural network operation the identified feature values, wherein the predicted latency of the current command is the latency to complete the current command and includes the latency for performing all commands in the one or more instruction queues that are scheduled to be performed prior to the current command, the control circuit to compare the predicted latency to a first latency threshold, and when the predicted latency of the current command exceeds the first latency threshold the control circuit to identify a potential change to the commands in the one or more instruction queues the potential change defining a plurality of potential-commands, the control circuit to generate potential-command feature sets corresponding to respective potential-commands, the neural network engine to perform neural network operations using as input to the respective neural network operations feature values of the generated potential-command feature sets to predict a respective potential-latency of the respective potential-commands, the control circuit to compare the predicted respective potential-latency of the respective potential-commands of to a second latency threshold to identify a reduced-noise-instruction-queue pattern, and the control circuit to modify one or more of the commands in the one or more instruction queues or change a scheduling order in the one or more instruction queues to correspond to the reduced-noise-instruction-queue pattern;

the control circuit to not modify one or more of the commands in the one or more instruction queues when the predicted latency of the current command does not exceed the first latency threshold; and one of the write circuit, the program circuit and the erase circuit to perform a next command in the one or more instruction queues.

12. The flash controller of claim 11, comprising:

a reduced-noise-pattern lookup table stored in the flash controller, the reduced-noise-pattern lookup table including feature values corresponding to noisy patterns and associated values corresponding to reduced-noise-instruction-queue patterns, the control circuit to perform a lookup in the reduced-noise-pattern lookup table using feature values corresponding to a subsequent command having a latency that exceeds the first latency threshold to identify a reduced-noise-instruction-queue pattern corresponding to the subsequent command, and modify one or more of the commands in the one or more instruction queues or change the scheduling order to correspond to the reduced-noise-instruction-queue pattern corresponding to the subsequent command.

13. The flash controller of claim 11, wherein the feature values comprise an erase-suspend count that indicates a number of erase-suspend commands in the one or more instruction queues and a program-suspend count that indicates a number of program-suspend commands in the one or more instruction queues.

14. The flash controller of claim 13 wherein the changing the scheduling order comprises rescheduling one or more of the erase-suspend commands or program-suspend commands.

15. The flash controller of claim 11 wherein the second latency threshold is equal to the first latency threshold.

16. The flash controller of claim 11 wherein
the feature values include an erase count indicating the number of erase commands in the one or more instruction queues, a program count indicating the number of program commands in the one or inure instruction queues and a read count indicating the number of read commands in the uric or more instruction queues.

17. The flash controller of claim 11 wherein the identified feature values include a command type value corresponding to respective commands in the one or more instruction queues, a channel index value corresponding to respective commands in the one or more instruction queues, a die index value corresponding to respective commands in the one or more instruction queues, and a plane index value corresponding to respective commands in the one or more instruction queues.

\* \* \* \* \*

UNITED STATES PATENT AND TRADEMARK OFFICE
CERTIFICATE OF CORRECTION

PATENT NO. : 11,934,696 B2
APPLICATION NO. : 17/398091
DATED : March 19, 2024
INVENTOR(S) : Lorenzo Zuolo and Rino Micheloni It is certified that error appears in the above-identified patent and that said Letters Patent is hereby corrected as shown below:

In the Claims

Column 16, Line 52, Claim 1, replace "potential to" with --potential change to--.

Column 17, Line 3, Claim 1, replace "pattern:" with --pattern;--.

Signed and Sealed this
Thirtieth Day of April, 2024

Katherine Kelly Vidal
*Director of the United States Patent and Trademark Office*